Feb. 20, 1945. H. F. PATTERSON 2,369,848

POWER TRANSMISSION

Original Filed May 16, 1940 2 Sheets-Sheet 1

INVENTOR
Herbert F. Patterson.
BY
ATTORNEYS

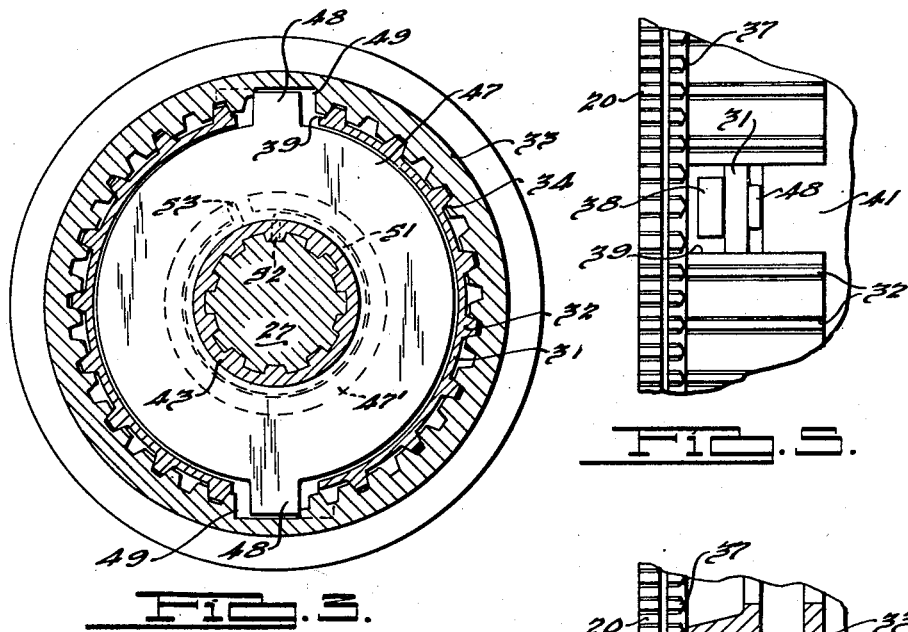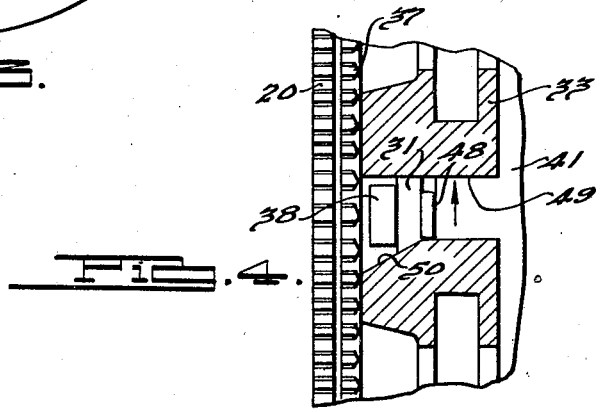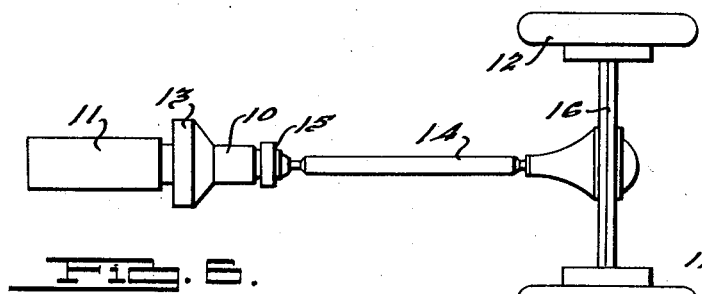

Patented Feb. 20, 1945

2,369,848

UNITED STATES PATENT OFFICE 2,369,848

POWER TRANSMISSION

Herbert F. Patterson, Detroit, Mich., assignor to Chrysler Corporation, Highland Park, Mich., a corporation of Delaware Original application May 16, 1940, Serial No. 335,434. Divided and this application January 15, 1942, Serial No. 426,800

10 Claims. (Cl. 192—45)

This application is a division of my co-pending application, Serial No. 335,434, filed May 16, 1940, which matured into Patent No. 2,309,864, February 2, 1943.

This invention relates to improvements in variable speed transmission mechanisms of the type particularly adapted for use in motor vehicles.

The principal object of the invention is to provide an improved three speed transmission particularly adapted for use in medium or low priced cars having an overrunning intermediate speed ratio drive which may be brought into action for accelerating the car without the necessity of disengaging the vehicle clutch.

An additional object is to provide in a transmission of the aforesaid type a control means for the overrunning clutch by means of which the drive therethrough may be positively controlled.

Further objects and advantages of the invention will be apparent from the following description taken in conjunction with the accompanying drawings, in which:

Fig. 3 is a sectional view taken approximately along the line 3—3 of Fig. 1 and looking forwardly of the transmission.

Fig. 4 is a sectional view taken along the line 4—4 of Fig. 1.

Fig. 5 is a view similar to Fig. 4 but with the shift sleeve removed.

Fig. 6 is a diagrammatic plan view of a motor vehicle embodying the transmission of the present invention.

Figures 1, 2:
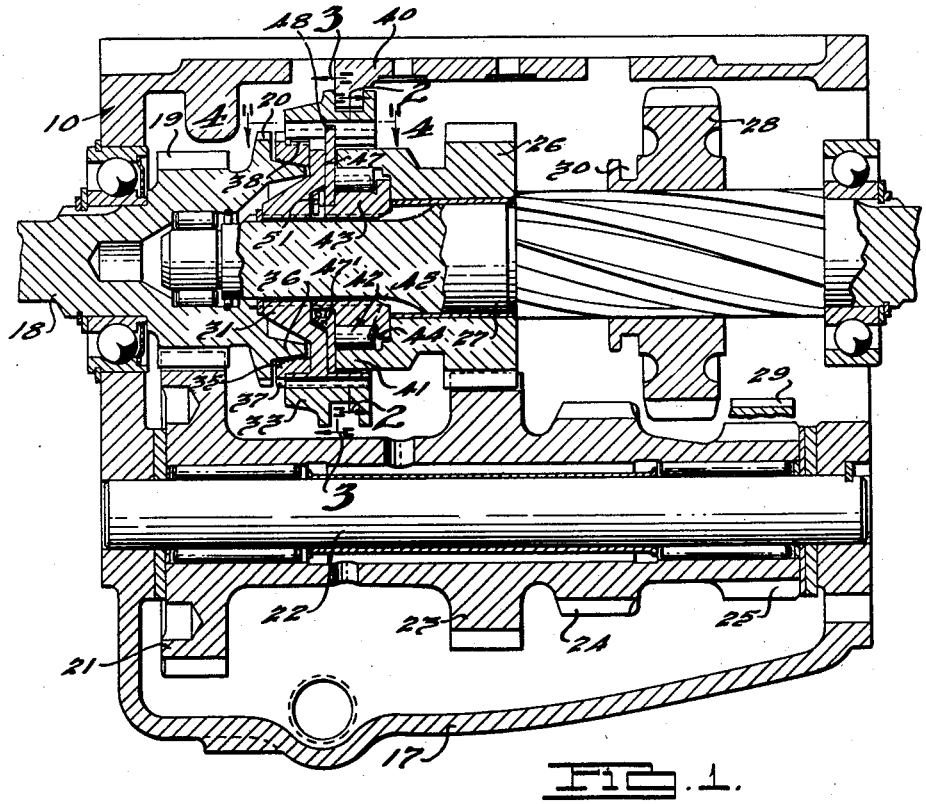
Fig. 1 is a longitudinal vertical sectional elevation of a power transmission embodying the present invention.
Fig. 2 is a sectional view taken approximately along the line 2—2 of Fig. 1 looking rearwardly of the transmission and with the shift sleeve in second speed position.

Referring to Figs. 1 and 6, it may be seen that the transmission 10 is interposed in the drive between the vehicle motor 11 and drive wheels 12, a suitable clutch 13 being provided to release the drive for shifting gears. A propeller shaft 14 connects the transmission 10 with the rear axle 16 through the usual differential mechanism, a propeller shaft brake 15 being provided for parking purposes.

The transmission 10 is contained within a casing 17 and comprises an input shaft 18 having a pinion 19 and a set of clutch teeth 20 formed thereon. The pinion 19 is in permanent mesh with a cluster gear 21 carried for rotation on a countershaft 22 mounted at each end in the casing 17. The countershaft gear cluster also comprises a second speed drive gear 23, a low speed drive gear 24 and a reverse drive gear 25. The gear 23 meshes with the second speed driven gear 26 which is journalled on the tail shaft 27, said shaft also carrying a low-reverse gear 28 which is splined thereon and is adapted to be shifted into mesh with gear 24 to establish low speed drive, or into mesh with reverse idler gear 29 to establish reverse drive, the latter gear being mounted adjacent gear 25 and in permanent mesh therewith.

The gear 28 is provided with a shift yoke receiving collar 30 which is adapted to receive the fingers of a shift yoke (not shown) for shifting in the usual manner.

Referring now to Figs. 1 to 5, it will be seen that the shaft 27 has splined thereon a driving hub 31 having external teeth 32 (Fig. 5) on which is slidably carried a shift sleeve 33 having internal teeth 34 (Fig. 2) which mesh with the teeth 32. A blocker-type synchronizer ring 35 is carried on the cone-shaped portion 36 of shaft 18 and has a set of blocking teeth 37 which are adapted to block shift of sleeve 33 into engagement with the clutch teeth 20 except when the shafts 18 and 27 are rotating at the same speed. The ring 35 has a pair of diametrically oppositely disposed lugs 38 which project outwardly into the slots 39 provided in the hub 31 as shown in Figs. 2, 4 and 5.

The sleeve 33 is engaged by a shift yoke 40 which is adapted to be shifted by suitable mechanism (not shown) under control of the driver. When the shaft 27 is rotating, the lug 38 will engage one side of the slot 39 and the ring 35 will be carried around with the hub 31, the teeth 37 under such conditions being misaligned with the teeth 20 and 34 to thereby block shift of the sleeve 33.

Upon shift of the sleeve 33 forwardly to engage the teeth 20, the teeth 34 will first engage the teeth 37 which are misaligned therewith and the ring 35 will be forced on to the cone portion 36 with considerable pressure whereupon the shaft 18 will be slowed down and brought into synchronism with the shaft 27 (the main vehicle clutch having been previously disengaged). The speed of shaft 18 will tend to fall below that of shaft 27, which is driven by the momentum of the vehicle, and the ring 35 will thereby be moved to unblock the teeth 34 whereupon the sleeve 33 will slide into engagement with the clutch teeth 20 to establish direct drive.

The hub 31 has alternate teeth removed to facilitate ease of shifting.

The second speed gear 26 has a forwardly extending sleeve portion 41 which forms the drive element of an over-running roller clutch 42, the driven element thereof comprising a sleeve 43 splined on shaft 27 as illustrated. A set of rollers 44, carried by a cage 45, act to establish a one-way drive between the elements 41 and 43 when in such position that they engage the upwardly sloping portions of cams 46 formed on the element 43. When the rollers 44 are in contact with the low portions of cams 46, no drive will be transmitted in either direction.

The cage 45 is carried by a disc-like member 47 which is journalled on the element 43 and has a pair of diametrically oppositely outwardly extending lugs 48 which respectively extend into a pair of correspondingly located longitudinal slots 49 milled in the sleeve 33 in radial alignment with the slots 39 of hub 31. The slots 49, as illustrated in Figs. 3 and 4, are cut away in an oblique direction as indicated at 50 for a purpose which will be presently explained.

As shown in Figs. 1 and 3, a spring 51 of the expansion type has one end engaged with the clutch element 43 at 52, the other end thereof engaging a slot 53 provided in the forward collar portion 47' of the disc 47. The spring 51 constantly urges the disc 47 in a counterclockwise direction as viewed in Fig. 3 thereby tending to maintain the rollers 44 of overrunning clutch 42 in engagement with the upwardly sloping or drive portions of cams 46.

When the sleeve 33 is in the position shown in the drawings with the lugs 48 in engagement with the straight side portions of the slots 49, the spring 51 is contracted and the disc 47 is in such position that the rollers 44 are free to roll on the low portions of cams 46. Thus, no drive will be transmitted through clutch 42 and this position of the sleeve corresponds to neutral in conventional transmissions. When the sleeve 33 is shifted forwardly to clutch with the teeth 20, the lugs 48 are still engaged with the straight portions of slots 49 and the rollers 44 are thus retained in non-driving position during direct drive setting of the transmission. When sleeve 33 is shifted rearwardly of neutral position, the lugs 48 then engage the inclined portions 50 of slots 49 and the disc 47 and cage 45 is rotated clockwise of Fig. 2 thereby to engage the rollers 44 of clutch 42 in driving relation relative to clutch elements 41 and 43. This position of sleeve 33 corresponds to second or intermediate speed ratio position in conventional transmissions and upon rotation of shaft 18, a one-way drive will be transmitted to shaft 27 through pinion 19; gears 21, 23 and 26 and clutch 42.

It is apparent that the drive in second speed ratio is a free wheeling drive in the forward direction, the shaft 27 overrunning the gear 26 during tendency of the shaft 27 to rotate faster than the shaft 18 such as during coast of the vehicle. The free wheeling drive is effective in second speed ratio only, the disc 47 functioning as explained above to lock the rollers 44 out of driving engagement in all other speeds.

It may therefore be readily seen that the present improved transmission does not require any different technique on the part of the vehicle driver than is required for driving vehicles equipped with conventional transmissions. However, the present transmission possesses a distinct advantage over conventional mechanisms in that the shift from second or intermediate speed to high or direct speed drive may be made without the necessity of disengaging the main vehicle clutch, it being necessary only to release the driving torque momentarily, preferably by closing the throttle for an instant, whereupon the shaft 27 will overrun and the sleeve 33 may be shifted into engagement with the teeth 20, the blocker-synchronizer ring 35 functioning to prevent clashing and facilitating a smooth and rapid shift. As the sleeve 33 is moved from its extreme rearward position, at which position the rollers 44 are in driving position, to its extreme forward position for establishing direct drive, the disc 47 is rotated clockwise of Fig. 3 through the action of the slots 49, the inclined portions 50 of which exert a thrust on the lugs 48 during forward movement of the sleeve which rotates the disc 47 against the force of spring 51. As is apparent from Fig. 4, the lugs 48 will be cammed in the direction indicated by the arrow on Fig. 4 during the movement of sleeve 33 from second speed position to neutral position by the inclined portions 50 of slots 49, the lugs being thereafter held in the neutral position by the straight portions of the slots. Similarly, when the sleeve 33 is shifted to second speed position, the lugs 48 will be moved in the opposite direction as permitted by the portions 50 under the influence of the spring 51.

The present improved transmission mechanism is particularly well adapted to use with power shifting devices such as, for example, fluid servomotors and solenoids, it being apparent that shifting between high and second speed ratio positions may be accomplished simply by releasing the driving torque of shaft 18 momentarily.

While I have described only one preferred embodiment of my invention, it is to be understood that various changes therein will be readily apparent to those skilled in the art and I do not intend to limit the invention in its broader aspects except as set forth in the claims appended hereto.

I claim:

1. Clutch means for establishing a one-way driving connection between a pair of power transmitting members comprising a set of rollers operatively disposed between said members, a cage for spacing said rollers; means constantly yieldably urging said cage and rollers into driving position from non-driving position thereof, said cage and yieldable means being so arranged and constructed such that one member will drive the other in one direction of drive when said cage and rollers are in driving position and will permit the other member to overrun the said one member in the same direction of drive when said cage and rollers are in drive position; and means for moving said cage and rollers into non-driving position including a shiftable sleeve and means constantly interconnecting said cage and sleeve.

2. In combination with a pair of co-acting power transmitting members, a roller clutch for establishing a one-way driving connection between said members, said clutch including a plurality of rollers and a cage for controlling the positions thereof; yieldable means for urging said cage and rollers into driving position; means for rotating said cage and rollers into non-driving position, said last means including a lug carried by said cage and a shiftable sleeve having a slot for receiving said lug, said slot being so arranged with respect to said lug that shift of said sleeve axially of said power transmitting members will rotate said cage.

3. In a clutch device, a driving element; a driven element; cam surfaces on one of said elements; a set of rollers disposed between said elements and adapted to wedge between said cam surfaces and said other clutch element thereby to lock said elements against overrun in one direction of rotation; yieldable means for urging said rollers to lock position; a cage for carrying said rollers; a lug on said cage; an axially shiftable sleeve having a slot for receiving said lug, said slot having a portion aligned with said shifting axis and a portion inclined with respect to said axis whereby said rollers and cage are bodily rotated in response to shift of said sleeve.

4. Clutch means for establishing a one-way driving connection between a pair of power transmitting members, comprising a set of rollers operatively disposed between said members, a cage for spacing said rollers, a torsion spring interconnecting said cage and one of said members for constantly urging said cage and rollers into driving position, and means for moving said cage and rollers into non-driving position and contracting said spring to condition said cage and rollers for return to driving position, comprising a cam and follower means under constant control of said cam and operatively connected to said cage.

5. Clutch means for establishing a one-way driving connection comprising a first rotatable element having a plurality of cam surfaces, a second rotatable element having a cylindrical surface, said elements arranged in telescopic position with their respective surfaces opposite each other; a set of wedging members operatively disposed between the said surfaces of said elements, a cage for spacing said wedging members, a torsion spring between said first element and said cage for constantly urging said cage and wedging members into driving position relative to said first and second elements, and control means for shifting said cage and wedging members to non-driving position comprising cam means and follower means, one of said cam means and follower means being carried by said cage and the other by said second element.

6. Clutch means for establishing a one-way connection between a pair of power transmitting members, comprising a set of wedging members operatively disposed between said members, a cage for spacing said wedging members, a torsion spring interconnecting said cage and one of said members for constantly urging said cage and wedging members into driving position, and means for rotating said cage and wedging members into non-driving position and contracting said spring to condition said cage and wedging members for return to driving position, comprising cam means and follower means under constant control of said cam means, one of said cam means and follower means being carried by said one member and the other being operatively connected to said cage.

7. In a clutch device, a driving element, a driven element, cam surfaces on said driven element and a cylindrical surface on said drive element, a set of wedging members disposed between said cam and cylindrical surface, a cage for spacing said wedging members, spring means interconnecting said cage and driven element for constantly yieldingly urging said cage and wedging members into driving position from non-driving position thereof, whereby said drive element may drive said driven element in a predetermined direction of drive and permit the driven element to overrun the drive element in the same direction of drive, and means for controlling movement of said cage and wedging members between drive and non-driving position comprising a shift element and a shift element carried by said driven element and a shift responsive element on said cage under constant control of said shift element.

8. In a clutch device, a rotatable driving element, a rotatable driven element, another rotatable element having a set of clutch teeth, cam surfaces on one of said driving and driven elements, a cylindrical surface on the other of said driving and driven elements, a set of wedging members disposed between said surfaces, a cage for spacing said wedging members, spring means interconnecting said cage and said element having said cam surfaces, for yieldingly urging said cage and wedging members into driving position relative to said surfaces from non-driving position thereof whereby said driving element may drive said driven element in a predetermined direction and permit the driven element to overrun the drive element in the same direction of drive, and means for controlling movement of said cage and wedging members between driving and non-driving position comprising a shift element having a set of clutch teeth engageable with the teeth of said other element and means co-acting with said cage and shiftable member and responsive to movement of said shiftable element to engage said sets of clutch teeth for moving said cage and wedging members from driving to non-driving position.

9. In a clutching mechanism for obtaining a plurality of power transmitting drives; a plurality of rotatable members one having a set of clutch teeth, a second having a plurality of cam surfaces and a third having a substantially cylindrical surface; a set of wedging members disposed between the cam and cylindrical surface of said second and third members; a cage for spacing said wedging members; resilient means operatively connecting said cage and second member for yieldingly urging said cage and wedging members into driving position relative to said surface from non-driving position thereof, whereby one of said second and third members is adapted to drive the other in a predetermined direction of rotation and permit the driven member of said second and third members to overrun the driving member in the same direction of drive; a shiftable member having a set of clutch teeth for engagement with the clutch teeth of said one member; and control means including means on said cage and means on said shiftable member for controlling the position of said cage and wedging members whereby said cage and wedging members are retained in driving position under control of said shiftable member when said sets of clutch teeth are disengaged and whereby said cage and wedging members are moved to non-driving position incident to engagement of said sets of clutch teeth and are retained in said non-driving position under control of said shiftable member during said engagement.

10. In a clutching mechanism for obtaining a plurality of power transmitting drives, a plurality of power transmitting members one having a set of clutch teeth, a second having a plurality of cam surfaces, and a third having a substantially cylindrical surface; a set of wedging members disposed between the cam and cylindrical surface of said second and third members; a cage for spacing said wedging members; resilient means for yieldingly urging said cage and wedging members into driving position relative to said surface from non-driving position thereof whereby one of said second and third members is adapted to drive the other in a predetermined direction of rotation and permit the driven member of said second and third members to overrun the driving member in the same direction of drive; a shiftable member having a set of clutch teeth for engaging with the clutch teeth of said one member; and control means cooperating with said cage and shiftable member for controlling the position of said cage and wedging members whereby said cage and wedging members are retained in driving position under control of said shiftable member when said sets of clutch teeth are in disengaged relation and whereby said clutch and wedging members are moved to non-driving position incident to engagement of said sets of clutch teeth and retained in said non-driving position under control of said shiftable member during said engagement.

HERBERT F. PATTERSON.